(12) United States Patent
Houchin-Miller et al.

(10) Patent No.: US 8,874,298 B2
(45) Date of Patent: Oct. 28, 2014

(54) BATTERY POWER SOURCE DEVICE

(75) Inventors: Gary P. Houchin-Miller, Fox Point, WI (US); Craig W. Rigby, Bayside, WI (US); Thomas J. Dougherty, Waukesha, WI (US); James S. Symanski, Greenfield, WI (US)

(73) Assignee: Johnson Controls—Saft Advanced Power Solutions LLC., Wilmington, DE (US)

( * ) Notice: Subject to any disclaimer, the term of this patent is extended or adjusted under 35 U.S.C. 154(b) by 0 days.

(21) Appl. No.: 13/806,075

(22) PCT Filed: Jun. 21, 2011

(86) PCT No.: PCT/US2011/041269
§ 371 (c)(1),
(2), (4) Date: Dec. 20, 2012

(87) PCT Pub. No.: WO2011/163244
PCT Pub. Date: Dec. 29, 2011

(65) Prior Publication Data
US 2013/0096762 A1 Apr. 18, 2013

Related U.S. Application Data

(60) Provisional application No. 61/357,860, filed on Jun. 23, 2010.

(51) Int. Cl.
*B60L 11/18* (2006.01)
*B60W 20/00* (2006.01)
*H02J 7/00* (2006.01)

(52) U.S. Cl.
CPC ........... *B60L 11/1864* (2013.01); *H02J 7/0013* (2013.01); *Y02T 10/7005* (2013.01); *B60L 11/1879* (2013.01); *Y02T 10/7061* (2013.01); *Y02T 10/7055* (2013.01); *Y10S 903/903* (2013.01)
USPC ........................... 701/22; 180/65.29; 903/903

(58) Field of Classification Search
CPC . B60L 11/1864; B60L 11/1877; H02J 7/0013
USPC ........................... 701/22; 180/65.29; 903/903
See application file for complete search history.

(56) References Cited

U.S. PATENT DOCUMENTS

2005/0274982 A1* 12/2005 Ueda et al. ................... 257/202

FOREIGN PATENT DOCUMENTS

| JP | 2006-034068 A | 2/2006 |
| JP | 2007-151396 A | 6/2007 |

(Continued)

OTHER PUBLICATIONS

NPL JP 2007-151396 A NPL KR 10-2008-0032454 A NPL JP 20012-038040 A.*

(Continued)

*Primary Examiner* — Calvin Cheung
*Assistant Examiner* — Yazan A Soofi
(74) *Attorney, Agent, or Firm* — Foley & Lardner LLP (57) ABSTRACT

A battery system includes a plurality of battery modules electrically coupled together in series. The battery system also includes a first electronic control unit (ECU) configured to act as a master ECU. The master ECU is electronically coupled to a first one of the plurality of battery modules. The battery system further includes a plurality of slave ECUs, wherein each slave ECU is electronically coupled to one of the other of the plurality of battery modules. The master ECU is configured to control whether electrical power is provided to each of the plurality of slave ECUs.

19 Claims, 9 Drawing Sheets

(56) References Cited

FOREIGN PATENT DOCUMENTS

| | | | | |
|---|---|---|---|---|
| JP | 2007151396 | A | * | 6/2007 |
| JP | 2012038040 | A | * | 2/2012 |
| KR | 10-2008-0032454 | A | | 4/2008 |
| KR | 10 2008 0032454 | A | * | 4/2008 |

OTHER PUBLICATIONS

International Search Report and Written Opinion of International Application No. PCT/US2011/041269, date of mailing Dec. 28, 2011, 7 pages.

* cited by examiner

BATTERY POWER SOURCE DEVICE

CROSS-REFERENCE TO RELATED PATENT APPLICATIONS

This application is a U.S. National Phase Application of International Application No. PCT/US2011/041269, filed Jun. 21, 2011, which claims the benefit of and priority to U.S. Provisional Application No. 61/357,860, filed Jun. 23, 2010, the entire disclosure of which is incorporated herein by reference.

BACKGROUND

The present application relates generally to the field of batteries and battery systems. More specifically, the present application relates to batteries and battery systems that may be used in vehicle applications to provide at least a portion of the motive power for the vehicle.

Vehicles using electric power for all or a portion of their motive power (e.g., electric vehicles (EVs), hybrid electric vehicles (HEVs), plug-in hybrid electric vehicles (PHEVs), and the like, collectively referred to as "electric vehicles") may provide a number of advantages as compared to more traditional gas-powered vehicles using internal combustion engines. For example, electric vehicles may produce fewer undesirable emission products and may exhibit greater fuel efficiency as compared to vehicles using internal combustion engines (and, in some cases, such vehicles may eliminate the use of gasoline entirely, as is the case of certain types of PHEVs).

As electric vehicle technology continues to evolve, there is a need to provide improved power sources (e.g., battery systems or modules) for such vehicles. For example, it is desirable to increase the distance that such vehicles may travel without the need to recharge the batteries. It is also desirable to improve the performance of such batteries and to reduce the cost associated with the battery systems.

One area of improvement that continues to develop is in the area of battery chemistry. Early electric vehicle systems employed nickel-metal-hydride (NiMH) batteries as a propulsion source. Over time, different additives and modifications have improved the performance, reliability, and utility of NiMH batteries.

More recently, manufacturers have begun to develop lithium-ion batteries that may be used in electric vehicles. There are several advantages associated with using lithium-ion batteries for vehicle applications. For example, lithium-ion batteries have a higher charge density and specific power than NiMH batteries. Stated another way, lithium-ion batteries may be smaller than NiMH batteries while storing the same amount of charge, which may allow for weight and space savings in the electric vehicle (or, alternatively, this feature may allow manufacturers to provide a greater amount of power for the vehicle without increasing the weight of the vehicle or the space taken up by the battery system).

It is generally known that lithium-ion batteries perform differently than NiMH batteries and may present design and engineering challenges that differ from those presented with NiMH battery technology. For example, lithium-ion batteries may be more susceptible to variations in battery temperature than comparable NiMH batteries, and thus systems may be used to regulate the temperatures of the lithium-ion batteries during vehicle operation. The manufacture of lithium-ion batteries also presents challenges unique to this battery chemistry, and new methods and systems are being developed to address such challenges.

It would be desirable to provide an improved battery module and/or system for use in electric vehicles that addresses one or more challenges associated with NiMH and/or lithium-ion battery systems used in such vehicles. It also would be desirable to provide a battery module and/or system that includes any one or more of the advantageous features that will be apparent from a review of the present disclosure.

SUMMARY

According to an exemplary embodiment, a battery system includes a plurality of battery modules electrically coupled together in series. The battery system also includes a first electronic control unit (ECU) configured to act as a master ECU. The master ECU is electronically coupled to a first one of the plurality of battery modules. The battery system further includes a plurality of slave ECUs, wherein each slave ECU is electronically coupled to one of the other of the plurality of battery modules. The master ECU is configured to control whether electrical power is provided to each of the plurality of slave ECUs.

According to another exemplary embodiment, a method for controlling the battery system of the previous paragraph includes receiving a control signal by the master ECU, analyzing the control signal using the master ECU, and controlling power to the plurality of slave ECUs based on the control signal using the master ECU.

DETAILED DESCRIPTION

Figure 1:
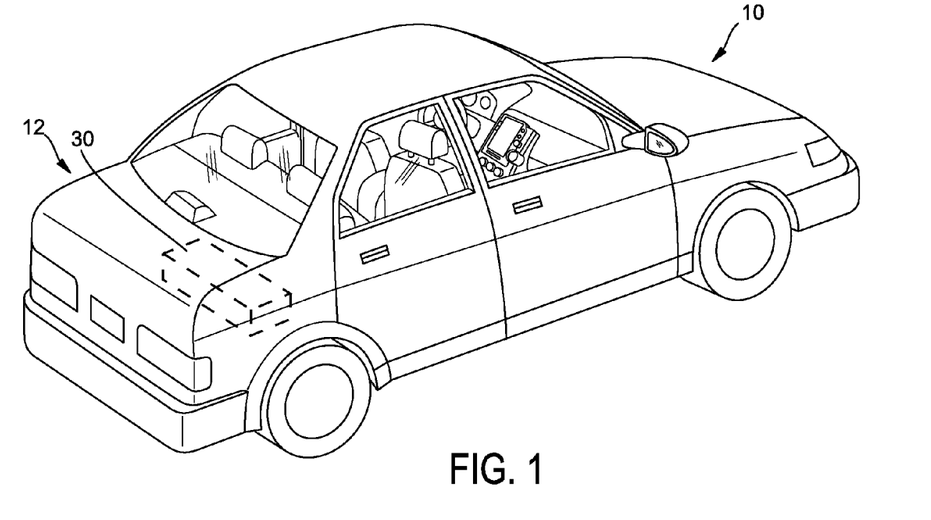
FIG. 1 is a perspective view of a vehicle including a battery system according to an exemplary embodiment.

FIG. 1 is a perspective view of a vehicle 10 in the form of an automobile (e.g., a car) having a battery system 30 for providing all or a portion of the motive power for the vehicle 10. Such a vehicle 10 can be an electric vehicle (EV), a hybrid electric vehicle (HEV), a plug-in hybrid electric vehicle (PHEV), or other type of vehicle using electric power for propulsion (collectively referred to as "electric vehicles").

Although illustrated as a car in FIG. 1, the type of vehicle may differ according to other exemplary embodiments, all of which are intended to fall within the scope of the present disclosure. For example, the vehicle 10 may be a truck, bus, industrial vehicle, motorcycle, recreational vehicle, boat, or any other type of vehicle that may benefit from the use of electric power for all or a portion of its propulsion power.

Although the battery system 30 is illustrated in FIG. 1 as being positioned in the trunk or rear 12 of the vehicle 10, according to other exemplary embodiments, the location of the battery module 30 may differ. For example, the position of the battery system 30 may be selected based on the available space within a vehicle 10, the desired weight balance of the vehicle 10, the location of other components used with the battery system 30 (e.g., battery management systems, vents or cooling devices, etc.), and a variety of other considerations.

Figure 2:
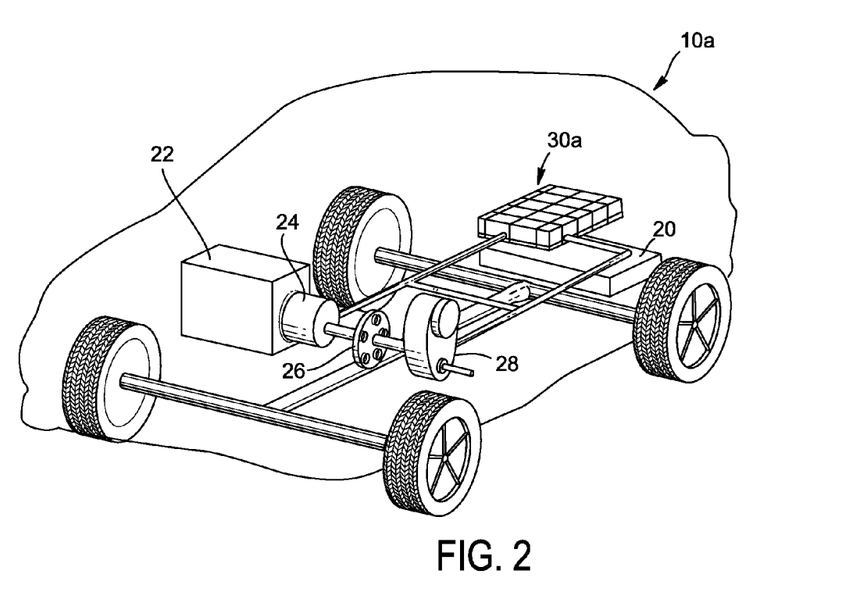
FIG. 2 is a cutaway schematic view of a hybrid electric vehicle according to an exemplary embodiment.

FIG. 2 illustrates a cutaway schematic view of a vehicle 10a provided in the form of an HEV according to an exemplary embodiment. A battery system 30a is provided toward the rear 12 of the vehicle 10a proximate a fuel tank 20 (the battery system 30a may be provided immediately adjacent the fuel tank 20 or may be provided in a separate compartment in the rear 12 of the vehicle 10a (e.g., a trunk) or may be provided elsewhere in the vehicle 10a). An internal combustion engine 22 is provided for times when the HEV utilizes gasoline power to propel the vehicle 10. An electric motor 24, a power split device 26, and a generator 28 are also provided as part of the vehicle drive system. Such an HEV may be powered or driven by just the battery system 30a, by just the engine 22, or by both the battery system 30a and the engine 22. It should be noted that other types of vehicles and configurations for the vehicle electrical system may be used according to other exemplary embodiments, and that the schematic illustration of FIG. 2 should not be considered to limit the scope of the subject matter described in the present application.

According to various exemplary embodiments, the size, shape, and location of the battery system 30, 30a the type of vehicle 10, 10a the type of vehicle technology (e.g., EV, HEV, PHEV, etc.), and the battery chemistry, among other features, may differ from those shown or described.

According to an exemplary embodiment, the battery system 30, 30a is responsible for packaging or containing electrochemical cells or batteries, connecting the electrochemical cells to each other and/or to other components of the vehicle electrical system, and regulating the electrochemical cells and other features of the battery system 30, 30a. For example, the battery system 30, 30a may include features that are responsible for monitoring and controlling the electrical performance of the system, managing the thermal behavior of the system, containment and/or routing of effluent (e.g., gases that may be vented from a battery cell), and other aspects of the battery module or system.

Figure 3:
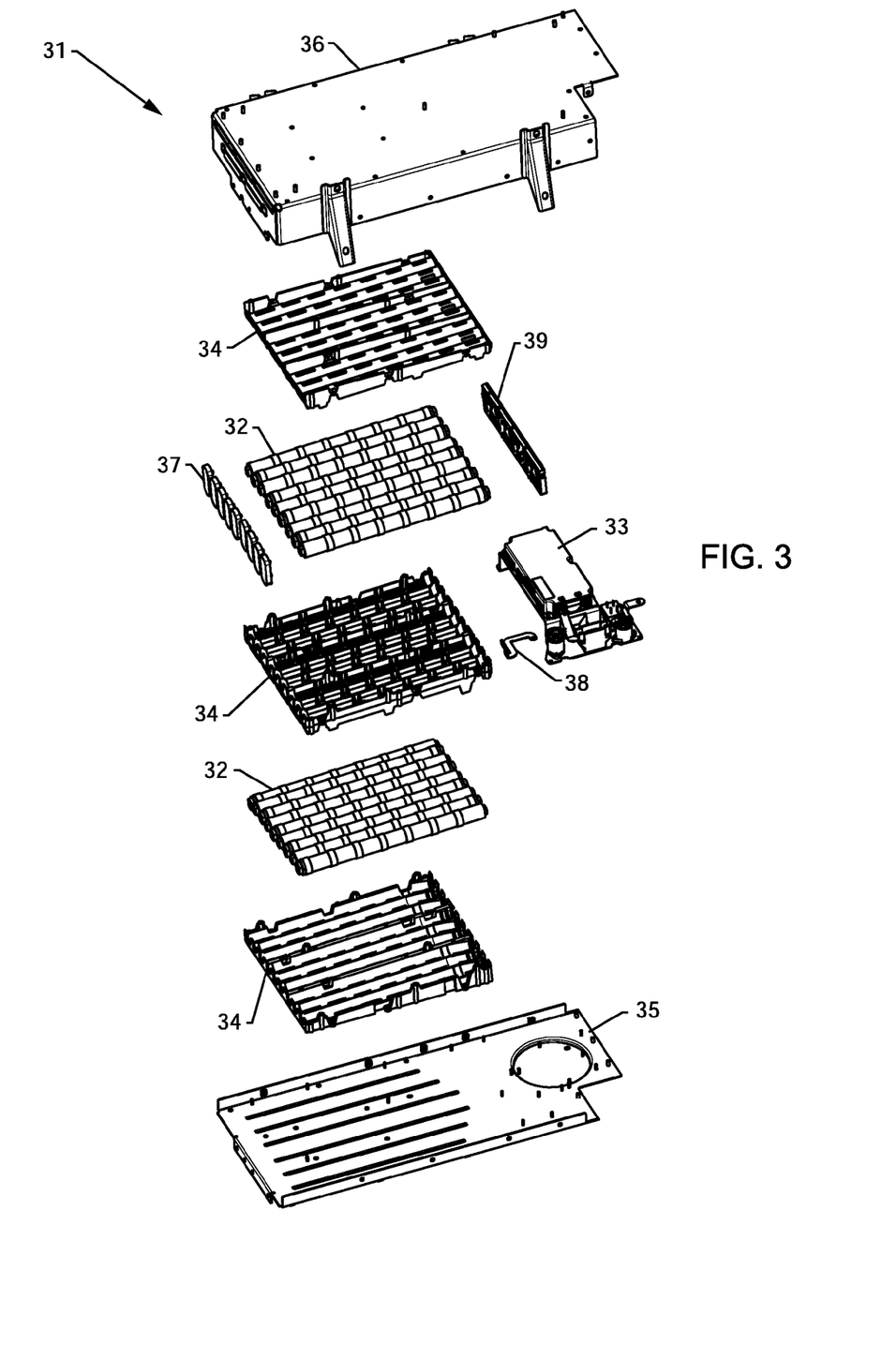
FIG. 3 is a partial exploded view of a portion of a battery system according to an exemplary embodiment.

Referring to FIG. 3, a partial exploded view of a portion of a battery system 31 is shown according to an exemplary embodiment. The battery system 31 includes a plurality of electrochemical cells or batteries 32 (e.g., lithium-ion cells, nickel-metal-hydride cells, lithium polymer cells, etc., or other types of electrochemical cells now known or hereafter developed). According to an exemplary embodiment, the electrochemical cells 32 are generally cylindrical lithium-ion cells configured to store an electrical charge. According to other exemplary embodiments, cells 32 could have other physical configurations (e.g., oval, prismatic, polygonal, etc.). The capacity, size, design, and other features of the cells 32 may also differ from those shown according to other exemplary embodiments.

Although illustrated in FIG. 3 as having a particular number of electrochemical cells 32, it should be noted that according to other exemplary embodiments, a different number and/or arrangement of electrochemical cells 32 may be used depending on any of a variety of considerations (e.g., the desired power for the battery system 30, the available space within which the battery module must fit, etc.).

According to an exemplary embodiment, the battery system 31 includes a plurality of trays or structures 34 that are configured to receive the electrochemical cells 32. The trays 34 may include features (e.g., sidewalls, etc.) that are intended to receive and arrange the cells 32. The trays 34 may be made of a polymeric material or other suitable material (e.g., electrically insulative materials). The trays 34 may also include features to provide spacing of the cells 32 away from the surface of the tray and/or from adjacent cells 32. A base 35 and a cover 36 may be provided to partially or completely surround or enclose the cells 32.

While FIG. 3 shows an exemplary embodiment of a battery system 31, it should be understood that the battery system 31 is not limited to any particular arrangement as will be appreciated by those reviewing this disclosure. For instance, while the battery system 31 shown in FIG. 3 is shown with generally horizontally oriented cells 32 arranged in two layers or groups, it should be understood that the battery system 31 may have many different configurations. For example, the cells 32 may also have a generally vertical orientation, may be arranged in several separate groups, or may be arranged in other configurations. Furthermore, different numbers and/or types (e.g., nickel-metal-hydride, etc.) of cells may be used.

According to the exemplary embodiment shown in FIG. 3, the cells 32 are arranged end-to-end to form cell stick modules. Each of the cell stick modules are electrically coupled to another cell stick module or to other components of the battery system 31 using connectors provided in the form of bus bars 37, connectors 38 or similar elements. According to an exemplary embodiment, some of the bus bars are housed or contained in a bus bar holder 39.

According to an exemplary embodiment, the battery system 31 may further include other components such as a battery management system 33. The battery management system 33 monitors the battery system 31 and may be configured to control temperature management and power distribution to and from the cells 32. According to an exemplary embodiment, the battery management system 33 comprises a battery control system (such as, e.g., as shown in FIGS. 4-8 and described below).

Figure 4:
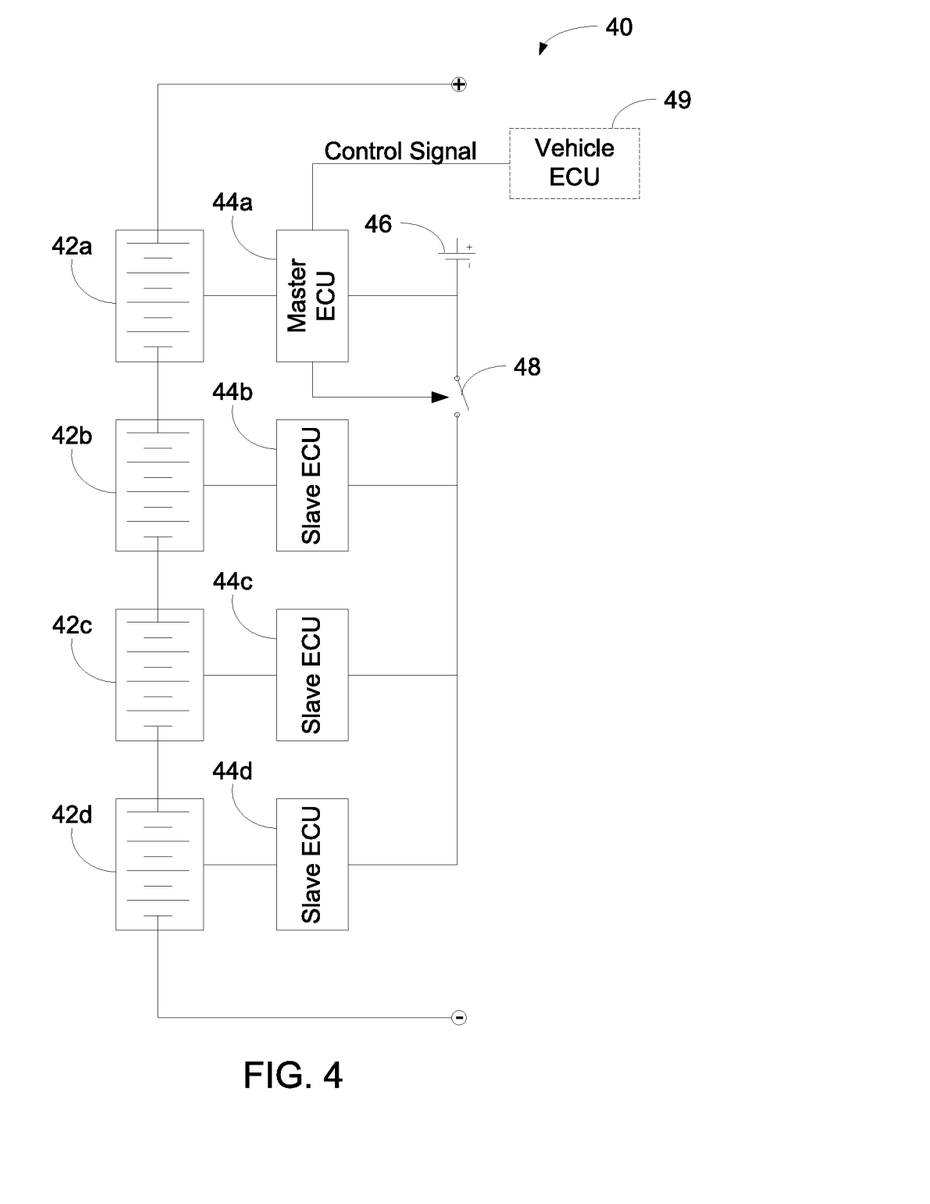
FIG. 4 is a schematic diagram of a battery control system according to an exemplary embodiment.

Referring to FIG. 4, a battery control system 40 is illustrated schematically according to an exemplary embodiment. The battery control system 40 includes multiple battery packs or battery modules 42a-42d that are electrically coupled in series. It is noted that each battery module 42a-42d may include one or more individual cells (such as, e.g., cells 32 shown in FIG. 3) or one or more groups of cells (such as, e.g., the cell stick modules shown in FIG. 3).

According to an exemplary embodiment, each battery module 42a-42d is controlled by an electronic control unit (ECU) 44a-44d. Each ECU 44a-44d is configured to monitor the operating state or any abnormalities of the associated battery module 42a-42d, for example, by sensing voltage, current, and/or temperature of the battery module 42a-42d (or of the individual cells). Each ECU 44a-44d may also control a cooling system (e.g., a fan) for the respective battery modules 42a-42d based on a sensed temperature, calculate a state of charge (SOC) of the battery module 42a-42d based on sensed voltage and/or current, control charging of the battery module 42a-42d, etc.

According to an exemplary embodiment, each ECU 44a-44d is powered by an external power source 46 (i.e., not the battery module it monitors/controls). According to various exemplary embodiments, the ECUs 44a-44d may include any circuitry capable of monitoring and/or controlling the respective battery module 42a-42d, for example, a processing circuit, an application specific integrated circuit (ASIC), a programmable logic array (PLA), analog circuitry, etc.

The ECU of a first one of the battery modules is a master ECU 44a configured to control the other ECUs or slave ECUs 44b-44d. The master ECU 44a may determine whether the slave ECUs 44b-44d receive power or not based on a received control signal, for example, from a vehicle ECU 49 configured to control power output of the battery system 30 and an engine system. If the master ECU 44a determines based on the control signal that the slave ECUs 44b-44d should be turned off or should remain off (e.g., to conserve power), the master ECU 44a provides a control signal to a switch 48 to electronically decouple the slave ECUs 44b-44d from the master ECU 44a. If the master ECU 44a determines based on the control signal that the slave ECUs 44b-44d should be turned on or should remain on, the master ECU 44a provides a control signal to a switch to electronically couple the slave ECUs 44b-44d from the master ECU 44a. It is noted that according to various exemplary embodiments, the switch 48 may be any electronic device capable of electronically coupling or decoupling based on a received signal, for example, one or more transistors, one or more logic gates, an analog switch, etc.

It is noted that in some exemplary embodiments, the master ECU 44a may also control or determine data or control signals sent to the slave ECUs 44b-44d based either on the control signal from the vehicle ECU 49 or from independent calculations, for example, to alert the slave ECUs 44b-44d about how much power the battery should provide. In such cases, the master ECU 44a may also selectively provide data or control signals to the slave ECUs 44b-44d depending on whether power is provided to the slave ECUs 44b-44d.

Figure 5:
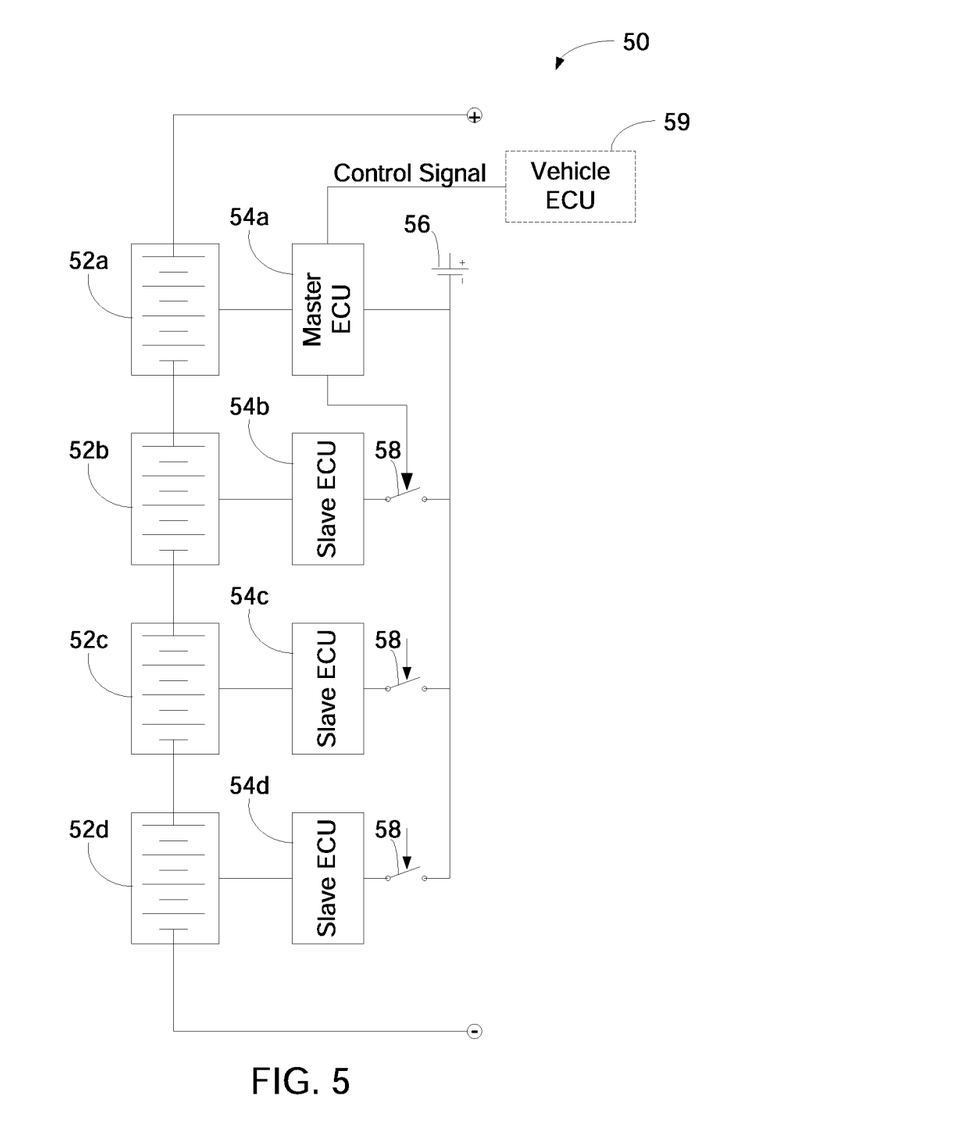
FIG. 5 is a schematic diagram of a battery control system according to another exemplary embodiment.

Referring to FIG. 5, a battery control system 50 similar to the system of FIG. 4 is illustrated schematically according to another exemplary embodiment. In the battery control system 50 of FIG. 5, a master ECU 54a is further configured to individually control which slave ECUs 54b-54d (if any) are to be coupled or decoupled to the ECU power source 56 rather than providing all or none of the slave ECUs 54b-54d with power. A switch 58 is coupled between each slave ECU 54b-54d and the ECU power source 56 and the master ECU 54a provides a control signal to each switch 58 turning it on or off. Similar to FIG. 4, the master ECU 54a is configured to receive a control signal from a vehicle ECU 59.

Figure 6:
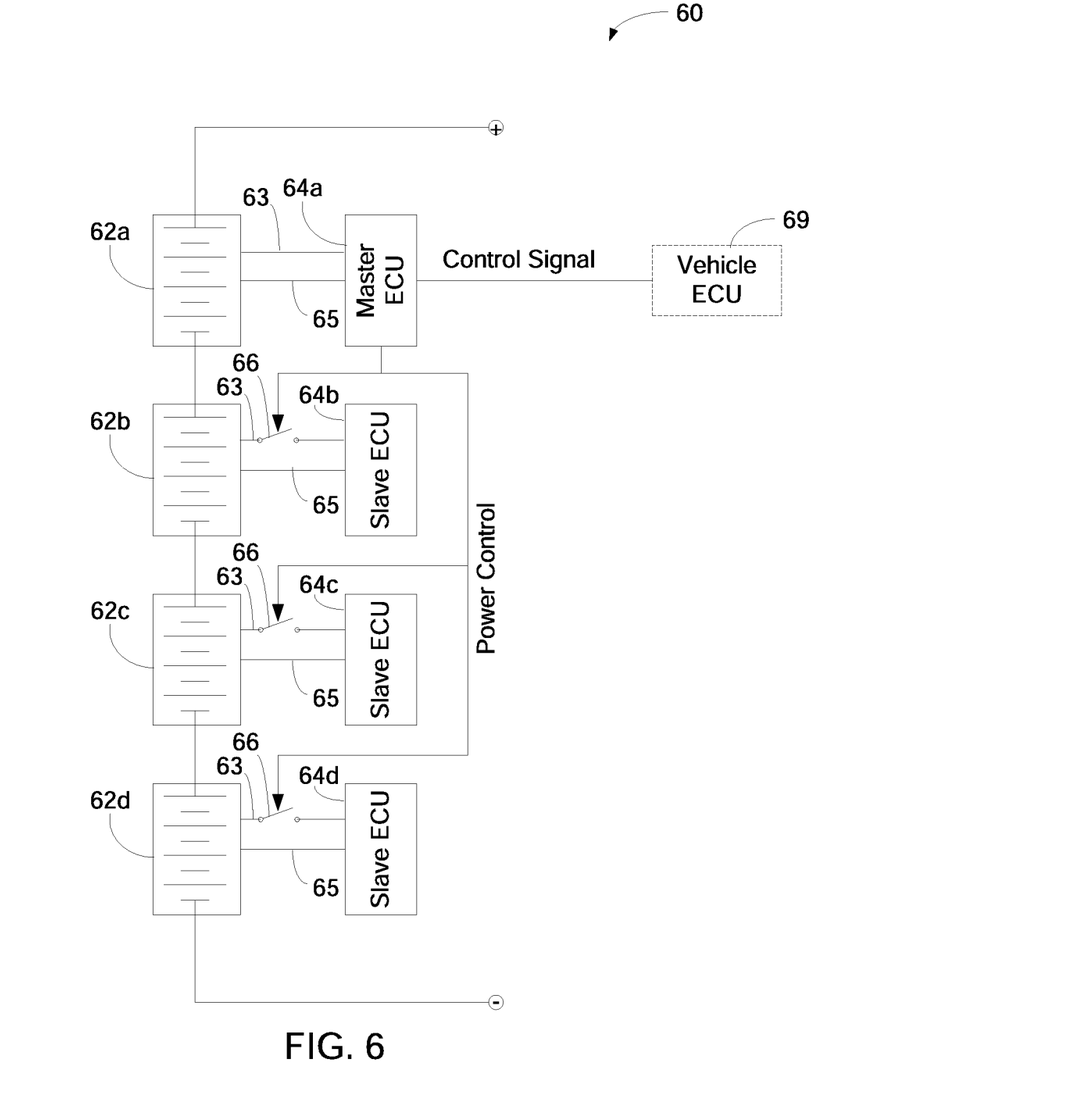
FIG. 6 is a schematic diagram of a battery control system according to yet another exemplary embodiment.

Referring to FIG. 6, a battery control system 60 similar to the systems of FIGS. 4 and 5 is illustrated schematically according to another exemplary embodiment. In the battery control system 60 of FIG. 6, a master ECU 64a and each slave ECU 64b-64d receives power from the battery module 62a-62d that it monitors/controls via an individual power line 63. A switch 68 is coupled on each power line 63 between each battery module 62b-62d and its respective slave ECU 64b-64d. The master ECU 64a is configured to individually control which slave ECUs 64b-64d (if any) are to be coupled or decoupled to their respective battery module 62b-62d as a power source (e.g., by a power control line). A data line 65 is also coupled between the master ECU 64a or slave ECUs 64b-64d and the respective battery module 62a-62d so that the ECUs 64a-64d may monitor or control each respective battery module 62a-62d. Similar to FIGS. 4 and 5, the master ECU 64a is configured to receive a control signal from a vehicle ECU 69.

Figure 7:
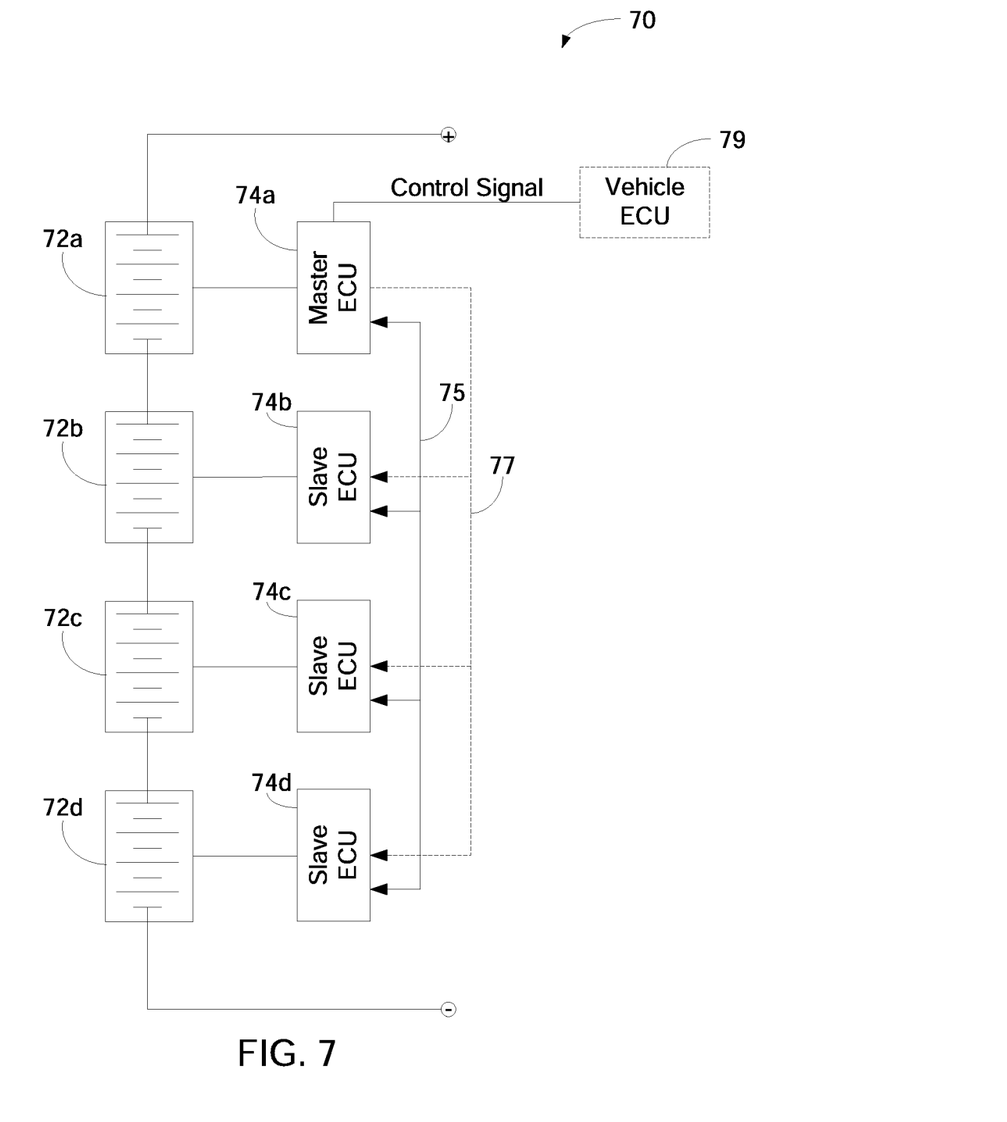
FIG. 7 is a schematic diagram of a battery control system according to yet another exemplary embodiment.

Referring to FIG. 7, a battery control system 70 similar to the systems of FIGS. 4-6 is illustrated schematically according to another exemplary embodiment. In the battery control system 70 of FIG. 7, a master ECU 74a is electronically coupled to each slave ECU 74b-74d via a data line 75 and a control line 77. It should be noted that a single data line 75 or control line 77 may couple the master ECU 74a to the slave ECUs 74b-74d, or the master ECU 74a may be coupled to the slave ECUs 74b-74d by a series of individual data lines 75 or control lines 77.

The master ECU 74a may send a control signal to one or more slave ECUs 74b-74d instructing it to monitor the associated battery module 72b-72d, activate from a sleep or power saving mode, receive data being provided by the master ECU 74a on the data line 75, or perform another function. The master ECU 74a may also send a control signal to one or more slave ECUs 74b-74d instructing it to stop monitoring the associated battery module 72b-72d, deactivate into a sleep or power saving mode, not receive data provided on the data line 75, etc. Alternatively, the slave ECUs 74b-74d may automatically enter a sleep mode or a power saving mode (e.g., turn portions of the ECU off, not perform operations, etc.) after a predetermined period of time until a control signal is received from the master ECU 74a.

The master ECU 74a may send data to the slave ECU 74b-74d on the data line 75 in order to assist the slave ECU 74b-74d in monitoring, balancing, or performing another function on the associated battery module 72b-72d. The slave ECUs 74b-74d may send data to the master ECU 74a and/or one or more slave ECUs 74b-74d on the data line 75 to provide data related to battery monitoring, balancing, state, etc. Similar to FIGS. 4-6, the master ECU 74a is configured to receive a control signal from a vehicle ECU 79.

Figure 8:
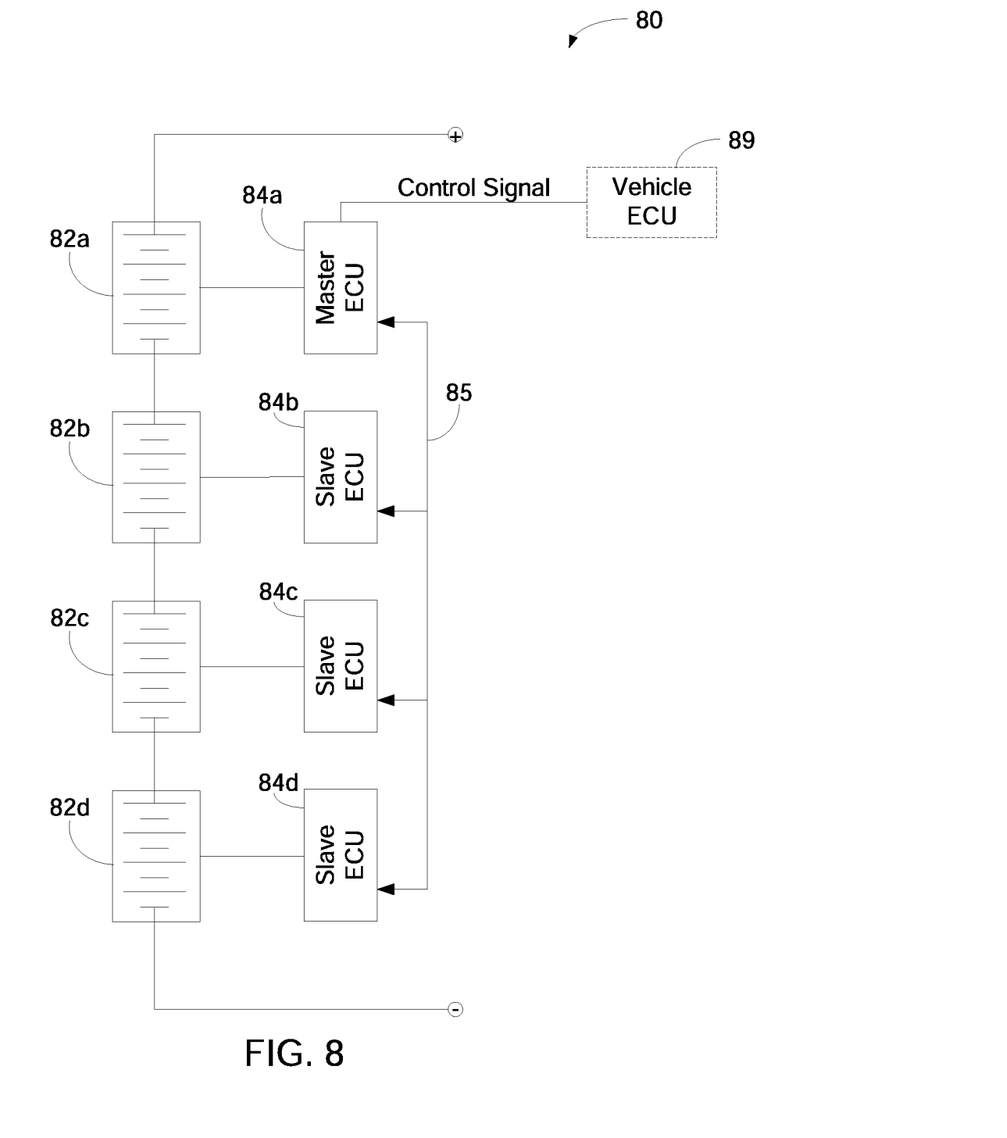
FIG. 8 is a schematic diagram of a battery control system according to yet another exemplary embodiment.

Referring to FIG. 8, a battery control system 80 similar to the system of FIG. 7 is illustrated schematically according to another exemplary embodiment. In the battery control system 80 of FIG. 8, a master ECU 84a is electronically coupled to each slave ECU 84b-84d via a data line 85. It should be noted that a single data line 85 may couple the master ECU 84a to the slave ECUs 84b-84d, or the master ECU 84a may be coupled to the slave ECUs 84b-84d by a series of individual data lines 75.

The master ECU 84a may send a data signal to one or more slave ECUs 84b-84d on the data line 85 to assist the slave ECU 84b-84d in monitoring, balancing, or performing another function on the associated battery module 82b-82d. If a data signal is received by a slave ECU 84b-84d, the slave ECU 84b-84d may automatically awaken from a sleep or power saving mode to use or operate on the data received from the master ECU 84a. The slave ECUs 84b-84d may send data to the master ECU 84a and/or one or more slave ECUs 84b-84d on the data line 85 to provide data related to battery monitoring, balancing, state, etc.

The slave ECUs 84b-84d may automatically enter a sleep mode or a power saving mode (e.g., turn portions of the ECU off, not perform operations, etc.) after a predetermined period of time until another data signal is received from the master ECU 84a. Alternatively, a slave ECU 84b-84d may receive an encoded data signal from the master ECU 84a instructing the slave ECU 84b-84d to deactivate or enter a power saving mode. Similar to FIGS. 4-7, the master ECU 84a is configured to receive a control signal from a vehicle ECU 89.

While a power source for the master and slave ECUs is not explicitly shown in FIGS. 7-8, the ECUs may receive power from the engine (e.g., an alternator), from a standalone battery or power source (e.g., a 12V starting battery), from the overall battery system, or from the respective battery module the ECU monitors.

It is noted that while a specific number of battery modules electrically coupled in series are shown in FIGS. 4-8, according to other exemplary embodiments, any number of battery modules and associated ECUs may be electrically coupled in series. According to other exemplary embodiments, additional batteries or battery modules and ECUs may also be electrically coupled in parallel to the battery modules coupled in series. In such exemplary embodiments, the master ECU may also control the power provided to the parallel slave ECUs and/or the operation of the parallel slave ECUs.

Figures 9, 10:
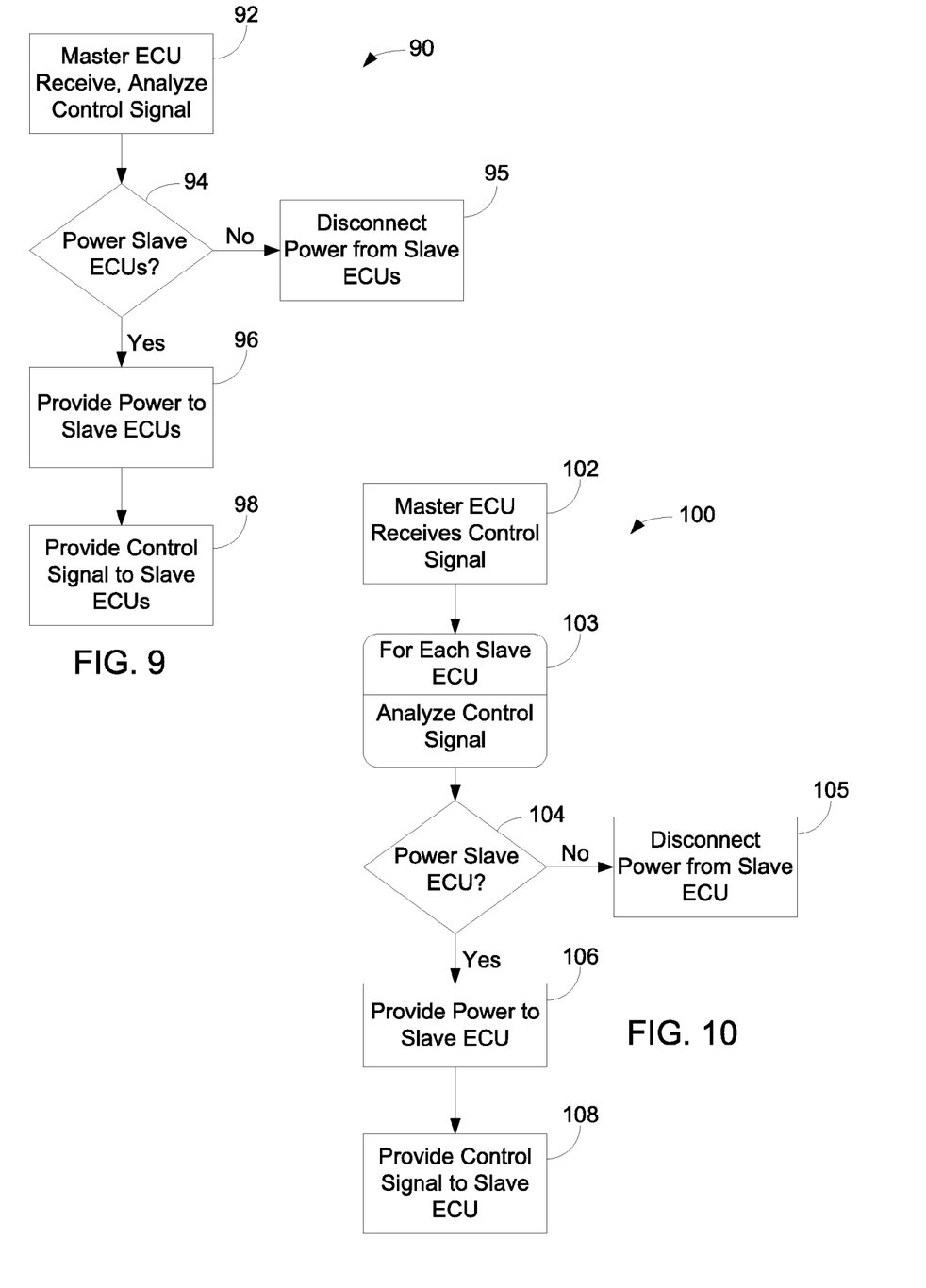
FIG. 9 is a process flow diagram illustrating a method in which a master ECU may control the power provided to slave ECUs according to an exemplary embodiment.
FIG. 10 is a process flow diagram illustrating a method in which a master ECU may control the power provided to slave ECUs according to another exemplary embodiment.

Referring to FIG. 9, a process flow diagram illustrates a method 90 in which the master ECU (e.g., the master ECU 44a shown in FIG. 4) controls the power provided to the slave ECUs according to an exemplary embodiment. The master ECU receives a control signal (e.g., from the vehicle ECU) for directing the master ECU whether or not to provide power to the slave ECUs (step 92). The master ECU analyzes the control signal and determines whether the slave ECUs are to receive power or not (step 94). For example, the control signal may have a bit that can be switched to indicate whether power should be provided or not. Alternatively, the master ECU may receive vehicle parameters and determine or calculate whether power should be provided or not. If the master ECU determines that power should not be provided to the slave ECUs, it electronically controls the switch to disconnect or electronically decouple the ECU power source from the slave ECUs (step 95). If the master ECU determines that power should be provided to the slave ECUs, it electronically controls the switch to provide or electronically couple the ECU power source to the slave ECUs (step 96). Once power is provided to the slave ECUs, according to some exemplary embodiments, the master control signal may provide additional control signals to the slave ECUs to provide further control (step 98).

Referring to FIG. 10, a process flow diagram illustrates a method 100 in which a master ECU (e.g., the master ECUs 54a, 64a shown in FIGS. 5 and 6) controls the power provided to the slave ECUs according to some exemplary embodiments. As with the method of FIG. 9, the master ECU receives a control signal (e.g., from the vehicle) for directing the master ECU whether or not to provide power to the slave ECUs (step 102). For each slave ECU, the master ECU analyzes the control signal (step 103) and determines whether the slave ECUs are to receive power or not (step 104). For example, the control signal may have a bit that can be switched to indicate whether power should be provided or not. Alternatively, the master ECU may receive vehicle parameters and determine or calculate whether power should be provided or not. If the master ECU determines that power should not be provided to the specific slave ECU, it electronically controls the switch to disconnect or electronically decouple the ECU power source from the slave ECU (step 105). If the master ECU determines that power should be provided to the slave ECU, it electronically controls the switch to provide or electronically couple the ECU power source to the slave ECU (step 106). Once power is provided to the slave ECU, according to some exemplary embodiments, the master control signal may provide additional control signals to the slave ECU to provide further control (step 108). The determination and switching of power occurs for each slave ECU switch and the master ECU may be configured to make the determinations and provide the switching signals in parallel or in series.

Figures 11, 12:
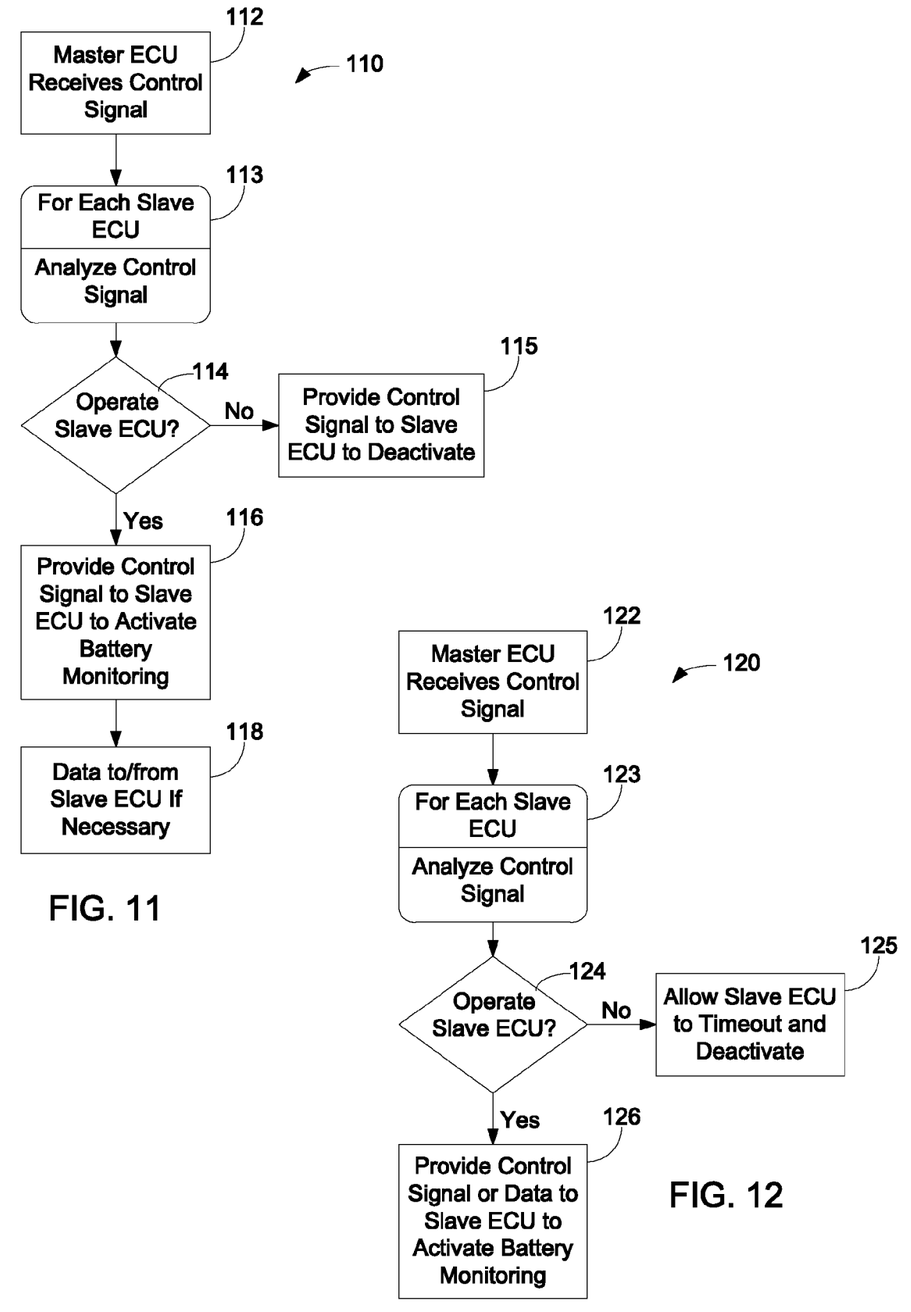
FIG. 11 is a process flow diagram illustrating a method in which a master ECU may control the power provided to slave ECUs according to yet another exemplary embodiment.
FIG. 12 is a process flow diagram illustrating a method in which a master ECU may control the power provided to slave ECUs according to yet another exemplary embodiment.

Referring to FIG. 11, a process flow diagram 110 illustrates a method in which a master ECU (e.g., the master ECU 74a shown in FIG. 7) controls the slave ECUs according to some exemplary embodiments. The master ECU receives a control signal (e.g., from the vehicle ECU) for directing the master ECU whether or not to provide control and/or data signals to the slave ECUs (step 112). For each slave ECU, the master ECU analyzes the control signal (step 113) and determines whether the slave ECUs are to be operated and receive control or data signals or not (step 114). For example, the control signal may have control words that indicate whether the slave ECU should be operated and what data or control parameters should be provided, if any. Alternatively, the master ECU may receive vehicle parameters and determine or calculate which data or control parameters should be provided. If the master ECU determines that the specific slave ECU should not be operated, the master ECU may provide a control signal to the slave ECU to deactivate it or set it to a power save or sleep mode (step 115). If the master ECU determines that the slave ECU should be operated, it may provide a control signal to the slave ECU to activate the slave ECU from a power save mode (e.g., to activate battery monitoring, balancing, etc.) (step 116). The control and data signals for each slave ECU may be determined and provided to the slave ECUs in parallel and/or in series (step 118).

Referring to FIG. 12, a process flow diagram 120 illustrates a method similar to the method of FIG. 11 in which a master ECU (e.g., master ECUS 74a, 84a shown in FIGS. 7 and 8) controls the slave ECUs according to some exemplary embodiments. The master ECU receives a control signal (e.g., from the vehicle ECU) for directing the master ECU whether or not to provide data signals to the slave ECUs (step 122). For each slave ECU, the master ECU analyzes the control signal (step 123) and determines whether the slave ECUs are to be operated and receive data signals or not (step 124). For example, the control signal may data to indicate whether the slave ECU should be operated and what data parameters should be provided, if any. Alternatively, the master ECU may receive vehicle parameters and determine or calculate which data or control parameters should be provided. If the master ECU determines that the specific slave ECU should not be operated, the master ECU may allow the slave ECU to deactivate or enter a power save or sleep mode (step 125). If the master ECU determines that the slave ECU should be operated, it may provide a data signal to the slave ECU (step 126). The data signal may automatically activate the slave ECU from a power save mode, for example to activate battery monitoring, balancing, etc). The data signals for each slave ECU may be determined and provided to the slave ECUs in parallel and/or in series.

According to an exemplary embodiment, a battery system includes a plurality of battery modules electrically coupled in series. The battery system also includes a master electronic control unit coupled to a first of the plurality of battery modules and a slave electronic control unit coupled to each of the other of the plurality of battery modules. The master electronic control unit is configured to control whether electrical power is provided to the slave electronic control units or not.

According to another exemplary embodiment, a method is configured for using a master electronic control unit coupled to a first battery to control power provided to one or more slave electronic control units each coupled to one or more batteries electronically coupled in series with the first battery. The method includes receiving a control signal at a master electronic control unit coupled to a first of the batteries, analyzing the control signal using the master electronic control unit, determining whether the power should be provided to the slave electronic control units using the master electronic control unit, and coupling or decoupling the slave electronic control units from a power source based on the determination.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the connector as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A battery system comprising:
   a plurality of battery modules electrically coupled together in series;
   a first electronic control unit (ECU) configured to act as a master ECU and electronically coupled to a first one of the plurality of battery modules to at least one of control and monitor the first one of the plurality of battery modules without any intervening ECU therebetween;
   a plurality of slave ECUs, wherein each slave ECU is electronically coupled to one of the other of the plurality of battery modules to at least one of control and monitor the battery module coupled thereto without any intervening ECU therebetween;
   wherein the master ECU is further configured to individually control whether electrical power is provided to each of the plurality of the slave ECUs independent of whether electrical power is provided to any other of the plurality of slave ECUs.

2. The battery system of claim 1, wherein the ECUs are coupled to an ECU power source.

3. The battery system of claim 2, wherein the master ECU is electronically coupled to a plurality of switches, each switch associated with one of the plurality of slave ECUs to control the electrical power thereto.

4. The battery system of claim 1, wherein each ECU is powered by the battery module with which it is associated.

5. The battery system of claim 4, wherein the master ECU is electronically coupled to a plurality of switches, each switch associated with one of the plurality of slave ECUs to control the electrical power thereto.

6. The battery system of claim 1, wherein the master ECU is electronically coupled to each of the slave ECUs by a control line to control the power to each of the slave ECUs.

7. The battery system of claim 6, wherein the master ECU is also electronically coupled to each of the plurality of slave ECUs by a data line.

8. The battery system of claim 1, wherein the master ECU is electronically coupled to each of the plurality of slave ECUs by a data line to control the power to each of the slave ECUs.

9. The battery system of claim 1, wherein the master ECU is electronically coupled to a vehicle ECU.

10. The battery system of claim 1, wherein each of the plurality of battery modules comprises a plurality of electrochemical cells.

11. A method for controlling a battery system comprising:
   receiving a control signal by the master ECU;
   analyzing the control signal using the master ECU; and
   controlling power to the plurality of slave ECUs based on the control signal using the master ECU;
   wherein the battery comprises
      a plurality of battery modules electrically coupled together in series;
      a first electronic control unit (ECU) configured to act as a master ECU and electronically coupled to a first one of the plurality of battery modules to at least one of control and monitor the first one of the plurality of battery modules without any intervening ECU therebetween;
      a plurality of slave ECUs, wherein each slave ECU is electronically coupled to one of the other of the plurality of battery modules to at least one of control and monitor the battery module coupled thereto without any intervening ECU therebetween;
      wherein the master ECU is further configured to individually control whether electrical power is provided to each of the plurality of the slave ECUs independent of whether electrical power is provided to any other of the plurality of slave ECUs.

12. The method of claim 11, further comprising analyzing the control signal for each individual slave ECU.

13. The method of claim 12, further comprising controlling the power to each individual slave ECU based on the control signal for each individual slave ECU.

14. The method of claim 13, wherein controlling the power to each individual slave ECU comprises sending a control signal to each individual slave ECU.

15. The battery system of claim 1, wherein the master ECU is electronically coupled to the first of the plurality of battery modules without an intervening ECU therebetween.

16. The battery system of claim 1, wherein the master ECU is electronically coupled to the first of the plurality of battery modules with a data line for the master ECU to control or monitor the first of the plurality of battery modules, and each slave ECU is electronically coupled to one of the other plurality of battery modules with an additional data line to control or monitor the battery module electronically coupled thereto.

17. The battery system of claim 1, wherein the master ECU is configured to send a control signal to one or more of the slave ECUs, and each slave ECU is configured to send to the master ECU a data signal related to conditions of the battery module electronically coupled thereto.

18. The battery system of claim 17, wherein the master ECU is configured to send the control signal to one or more of the slave ECUs with a control line, and each slave ECU is configured to send to the master ECU the data signal with a data line.

19. The battery system of claim 17, wherein the master ECU is configured to send the control signal to one or more of the slave ECUs to monitor the battery module electronically coupled thereto, to at least one of activate one or more of the slave ECUs from a power saving mode, and to receive data from the master ECU.

* * * * *